(12) United States Patent
Mukherji et al.

(10) Patent No.: US 8,800,145 B2
(45) Date of Patent: Aug. 12, 2014

(54) REFURBISHING METHOD AND SYSTEM FOR A MAIN ROTOR BLADE SPAR

(75) Inventors: Tapas K. Mukherji, Shelton, CT (US); Robert J. Araujo, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1568 days.

(21) Appl. No.: 12/345,813

(22) Filed: Dec. 30, 2008

(65) Prior Publication Data
US 2010/0162565 A1    Jul. 1, 2010

(51) Int. Cl.
*F01D 5/14*    (2006.01)

(52) U.S. Cl.
USPC ...................... 29/889.1; 29/402.11

(58) Field of Classification Search
USPC ............... 29/889.1, 402.03, 402.06, 402.11, 29/426.4, 426.5; 83/177
See application file for complete search history.

(56) References Cited

U.S. PATENT DOCUMENTS

| | | | |
|---|---|---|---|
| 3,574,924 A * | 4/1971 | Dibble | 228/119 |
| 3,999,888 A | 12/1976 | Zincone | |
| 4,247,255 A | 1/1981 | De Rosa | |
| 4,326,833 A * | 4/1982 | Zelahy et al. | 416/96 R |
| 4,362,588 A | 12/1982 | Anton et al. | |
| 4,432,696 A | 2/1984 | Stephan et al. | |
| 4,668,115 A | 5/1987 | Ferris et al. | |
| 4,797,064 A | 1/1989 | Ferris et al. | |
| 4,832,252 A | 5/1989 | Fraser | |
| 4,842,663 A | 6/1989 | Kramer | |
| 5,033,938 A | 7/1991 | Fraser et al. | |
| 5,149,013 A | 9/1992 | Costanzo et al. | |
| 5,174,024 A | 12/1992 | Sterrett | |
| 5,203,522 A | 4/1993 | White et al. | |
| 5,306,120 A | 4/1994 | Hammer et al. | |
| 5,460,487 A | 10/1995 | Schmaling et al. | |
| 5,542,820 A | 8/1996 | Eaton et al. | |
| 5,647,726 A | 7/1997 | Sehgal et al. | |
| 5,782,607 A | 7/1998 | Smith et al. | |
| 5,832,605 A | 11/1998 | Leahy et al. | |
| 5,836,062 A | 11/1998 | Leahy et al. | |
| 5,862,576 A | 1/1999 | Leahy et al. | |
| 5,908,522 A | 6/1999 | Lofstrom et al. | |
| 5,934,875 A | 8/1999 | Head | |
| 5,947,418 A | 9/1999 | Bessiere et al. | |
| 6,126,524 A * | 10/2000 | Shepherd | 451/75 |
| 6,229,123 B1 | 5/2001 | Kochman et al. | |
| 6,532,656 B1 * | 3/2003 | Wilkins et al. | 29/889.1 |
| 6,800,829 B1 * | 10/2004 | Nimmons | 219/69.17 |
| 7,078,658 B2 | 7/2006 | Brunner et al. | |
| 7,165,945 B2 | 1/2007 | Kovalsky et al. | |
| 7,201,561 B2 | 4/2007 | Parsons et al. | |
| 7,216,429 B2 | 5/2007 | Logan et al. | |
| 2002/0148115 A1 * | 10/2002 | Burke et al. | 29/889.1 |
| 2006/0186269 A1 * | 8/2006 | Kota et al. | 244/123.1 |
| 2009/0304497 A1 * | 12/2009 | Meier et al. | 415/170.1 |

FOREIGN PATENT DOCUMENTS

| | | |
|---|---|---|
| FR | 935 233 | 10/1946 |
| FR | 1 349 752 | 3/1963 |
| FR | 2 578 377 | 12/1984 |
| FR | 2 756 253 | 11/2007 |
| WO | 95/15670 | 6/1995 |
| WO | 99/35888 | 7/1999 |
| WO | 03/007659 | 1/2003 |

* cited by examiner

*Primary Examiner* — David Bryant
*Assistant Examiner* — Christopher Besler
(74) *Attorney, Agent, or Firm* — Carlson, Gaskey & Olds, P.C.

(57) ABSTRACT

A method of refurbishing a rotor blade utilizing a waterjet and an apparatus therefore.

19 Claims, 18 Drawing Sheets

REFURBISHING METHOD AND SYSTEM FOR A MAIN ROTOR BLADE SPAR

BACKGROUND

The present application relates to refurbishing a rotary wing aircraft main rotor blade.

Conventional rotary wing aircraft rotor blades include a spar that functions as the primary structural member of the rotor blade to react torsional, bending, shear, and centrifugal loads. Typically, a leading edge and trailing edge assembly envelop the spar to yield a desired airfoil contour. The spar typically extends along the length of the rotor blade and mounts at an inboard end to a cuff assembly that facilitates mounting to the rotor hub.

The spar is often manufactured of a high strength non-metallic composite material and/or high strength metallic material such as titanium alloy. The spar is a relatively expensive component that is often retrieved from a damaged or worn main rotor blade such that a remanufactured main rotor blade may thereby be assembled with the refurbished spar.

Spar retrieval is conventionally accomplished through heat decomposition and manual chiseling and scraping of main rotor blade components therefrom. Remnants of the main rotor blade components, oxidized coatings, adhesives and primer are conventionally stripped from the spar by dipping in a heated caustic solution then washing in water. These conventional high temperate processes are relatively labor intensive and may generate undesirable fumes.

SUMMARY

A method of refurbishing a rotor blade according to an exemplary aspect of the present application includes directing a waterjet to cut sections from a rotor blade spar and directing a spinning waterjet to mill remnants from the spar.

A method of refurbishing a rotor blade according to another exemplary aspect of the present application including directing a waterjet to cutoff an apex of a wear-resistant material strip from a rotor blade leading edge and directing the waterjet at a skimming angle relative to a rotor blade contour to remove the wear-resistant material strip therefrom.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 8B is an expanded sectional view of a rotor blade illustrating a lower blade sheath section and de-ice heater mat being removed from the leading edge section of the rotor blade;

DETAILED DESCRIPTION

Figure 1:
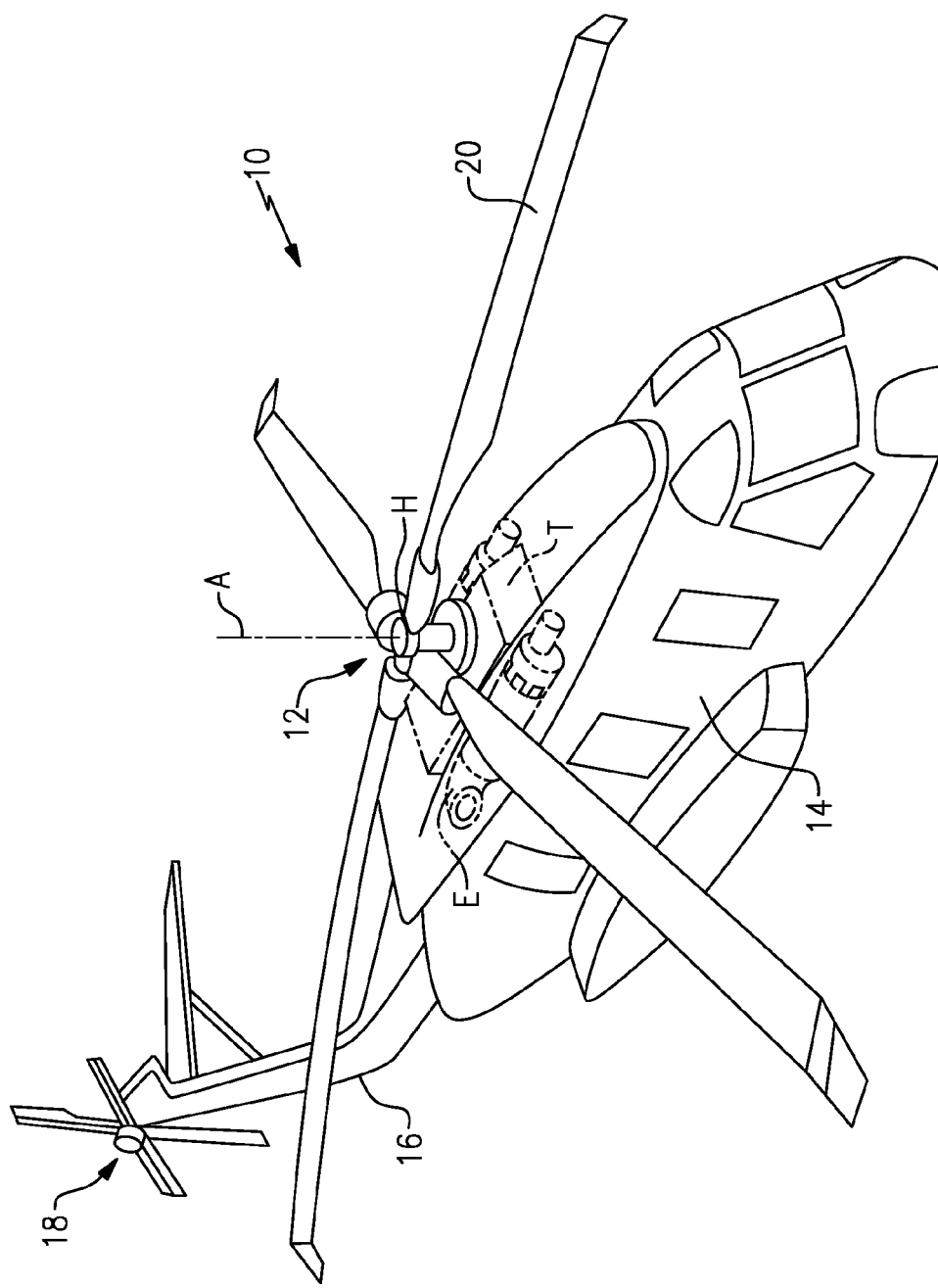
FIG. 1 is a schematic perspective view of a rotary wing aircraft according to one non-limiting embodiment of the present application.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven about an axis of rotation A through a main gearbox (illustrated schematically at T) by one or more engines E. The main rotor system 12 includes a multiple of rotor blade assemblies 20 mounted to a rotor hub H. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2A:
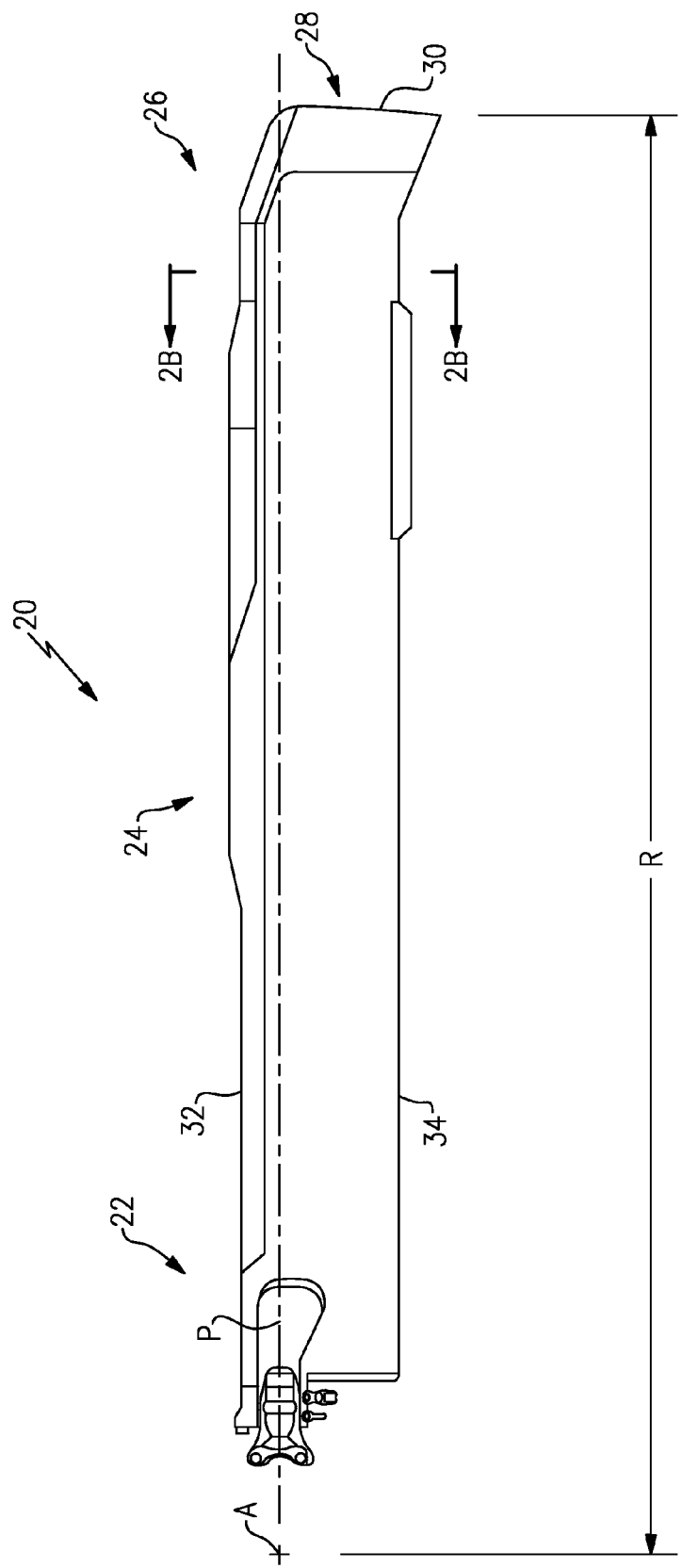
FIG. 2A is a perspective view of a main rotor blade.

Referring to FIG. 2A, each rotor blade assembly 20 (only one illustrated) of the main rotor assembly 12 includes a root section 22, an intermediate section 24, a tip section 26 and a tip cap 28. Each rotor blade section 22, 24, 26, 28 may define particular airfoil geometries to particularly tailor the rotor blade aerodynamics to the velocity increase along the rotor blade span. The rotor blade tip section 26 may include angled and non-angled forms such as anhedral, cathedral, gull, bent, and others. The rotor blade sections 22-28 define a span of the main rotor blade assembly 20 between the axis of rotation A and a distal end 30 of the tip cap 28 along a longitudinal feathering axis P between a leading edge 32 and a trailing edge 34. It should be understood that although a main rotor blade assembly 20 is illustrated in the non-limiting embodiments disclosed herein, other blade assemblies may also benefit herefrom.

Figure 2B:
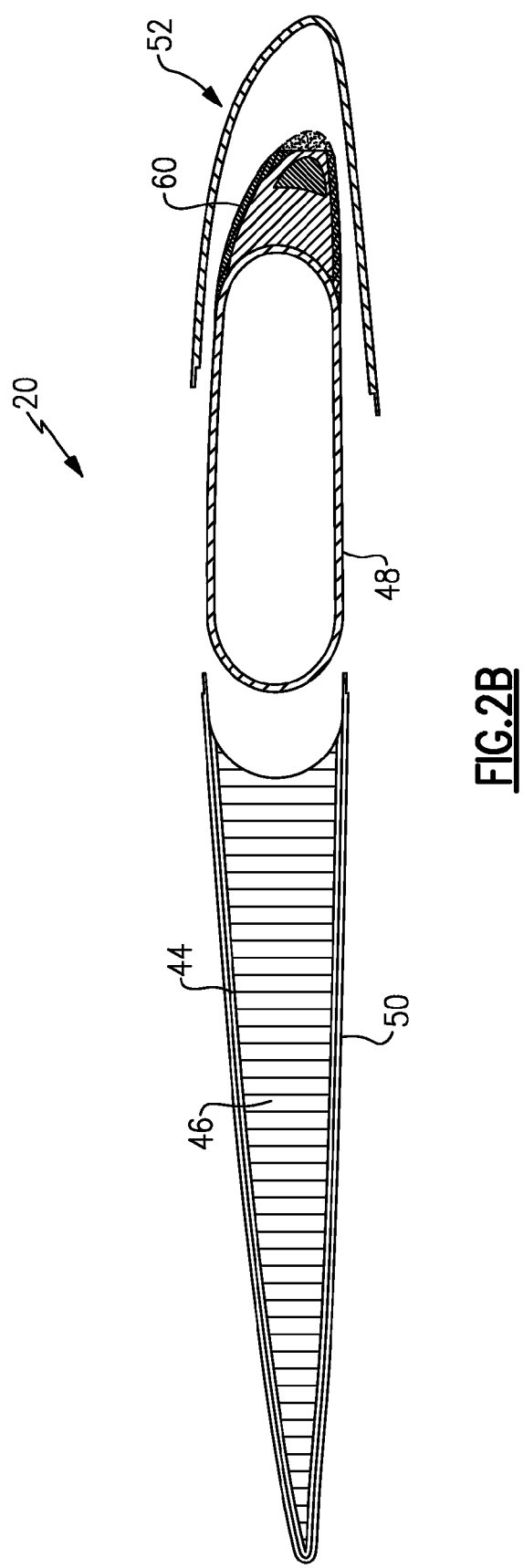
FIG. 2B is an exploded view of the main rotor blade of FIG. 2A.

Referring to FIG. 2B, the rotor blade assembly 20 generally includes an upper skin 44, a core 46, a main spar 48, a lower skin 50, and a leading edge assembly 52. The core 46 may include a lightweight foam material, honeycomb material or combinations thereof. The skins 44, 50 may be formed from several plies of prepreg composite material such as woven fiberglass material embedded in a suitable resin matrix. Wire mesh screen 44W, 50W (FIG. 2C; only 44W shown) may be embedded into at least one ply of the respective skins 44, 50 to provide an electrical path to the rotor hub H (FIG. 1). The main spar 48, core 46 and skins 44, 50 are generally referred to as a pocket assembly, the forward portion of which is closed out by the leading edge assembly 52. The spar 48 of the described non-limiting embodiment is formed from titanium; however, in alternative embodiments, the spar 48 may be formed from other metals, composite materials, or combinations thereof. It should be understood that the spar 48, core 46, skins 44, 50, and leading edge assembly 52 may be separated into a multiple of segments which may include various combinations of span-wise lengths.

Figure 2C:
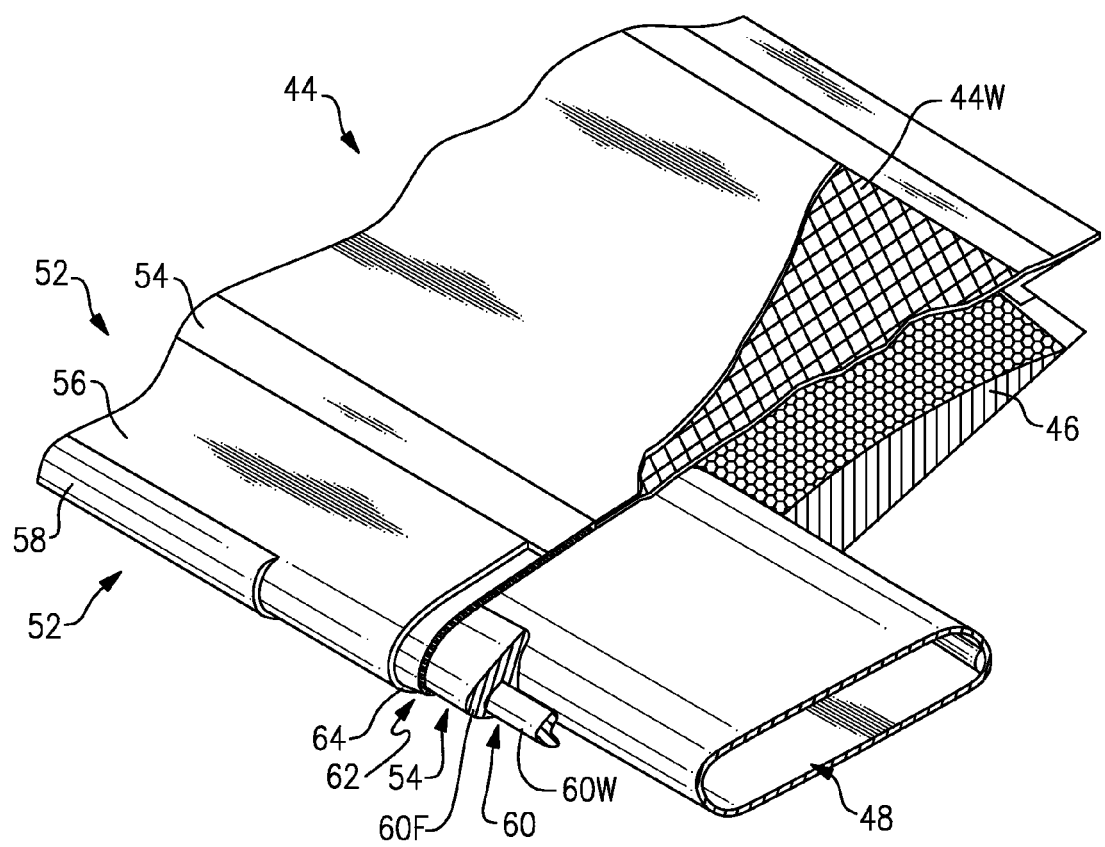
FIG. 2C is a perspective partially exploded view illustrating the components of the rotor blade of FIG. 2A.
Figure 2D:
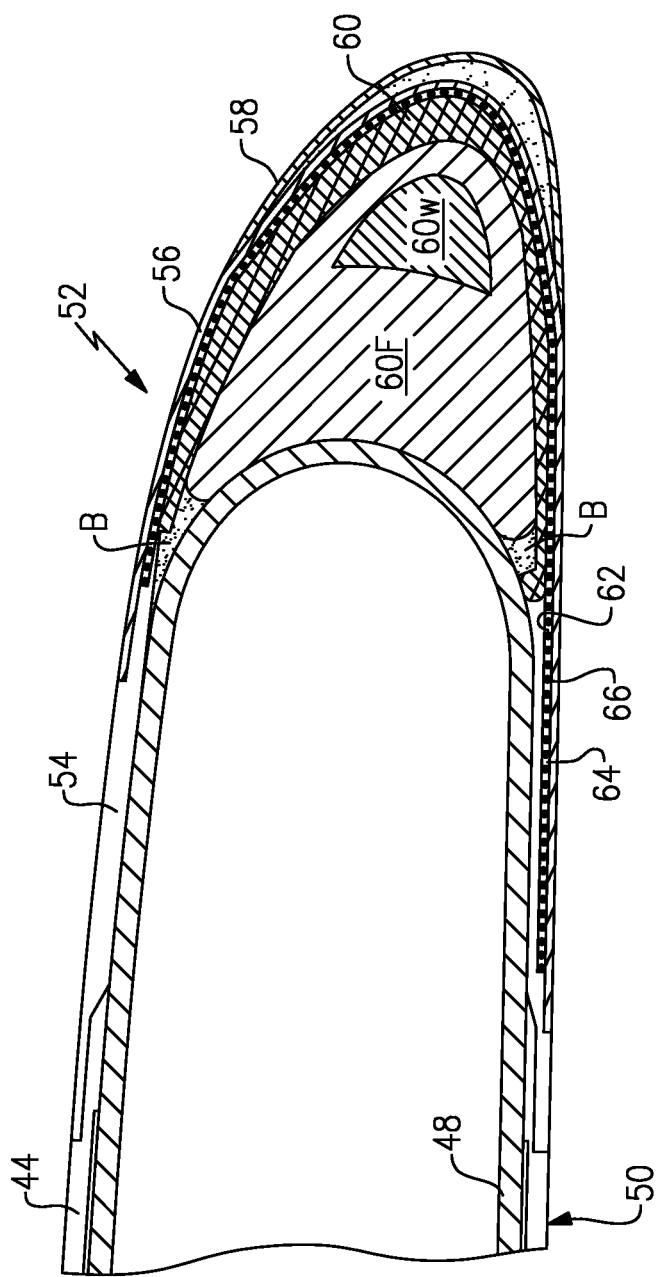
FIG. 2D is an expanded sectional view illustrating the components of the rotor blade of FIG. 2A.

Referring to FIGS. 2C and 2D, the leading edge assembly 52 generally includes a leading-edge sheath 54 upon which is mounted a first wear-resistant material strip 56 such as a titanium erosion strip and a second wear-resistant material strip 58 such as a nickel erosion strip to provide abrasion protection. The leading-edge sheath 54 defines the leading edge of the main rotor blade assembly 20. The leading-edge sheath 54 may be formed from several plies of prepreg composite material such as woven fiberglass material embedded in a suitable resin matrix. The second wear-resistant material strip 58 may be mounted at least partially over the first wear-resistant material strip 56. It should be understood that a variety of a wear-resistant materials may alternatively or additionally be included in the leading edge assembly 52.

A counterweight assembly 60 includes a filler 60F with a weight 60W located therein. The filler 60F may be formed from several plies of prepreg composite material such as woven fiberglass material embedded in a suitable resin matrix with the weight 60W contained therein. The counterweight assembly 60 may be adhesively bonded B to the leading edge of the spar 48 such that the counterweight assembly 60 is interposed between the leading-edge sheath 54 and the leading edge of the spar 48. The counterweight assembly 60 is utilized to statically and dynamically balance the main rotor blade assembly 20. In one non-limiting embodiment, the counterweight assembly 60 includes counterweights 60W that are, for example, fabricated from less dense to more dense materials, e.g., foam, tungsten, lead, and such like respectively, in the spanwise direction from the root section 22 to the tip section 26 so as to provide a weight distribution that statically and dynamically balances the main rotor blade assembly 20.

A de-ice heater mat assembly 62 is located within the leading-edge sheath 54 to at least partially surround the counterweight assembly 60 (see in particular FIG. 2C). That is, the de-ice heater mat assembly 62 may be one ply of the multiple of plies which form the leading-edge sheath 54. The heater mat assembly 62 may be manufactured of a flexible layer 64 that supports a number of resistive elements 66 which transit longitudinally along the span of the blade assembly 20.

Main Rotor Blade Spar Refurbishment

Figure 3:
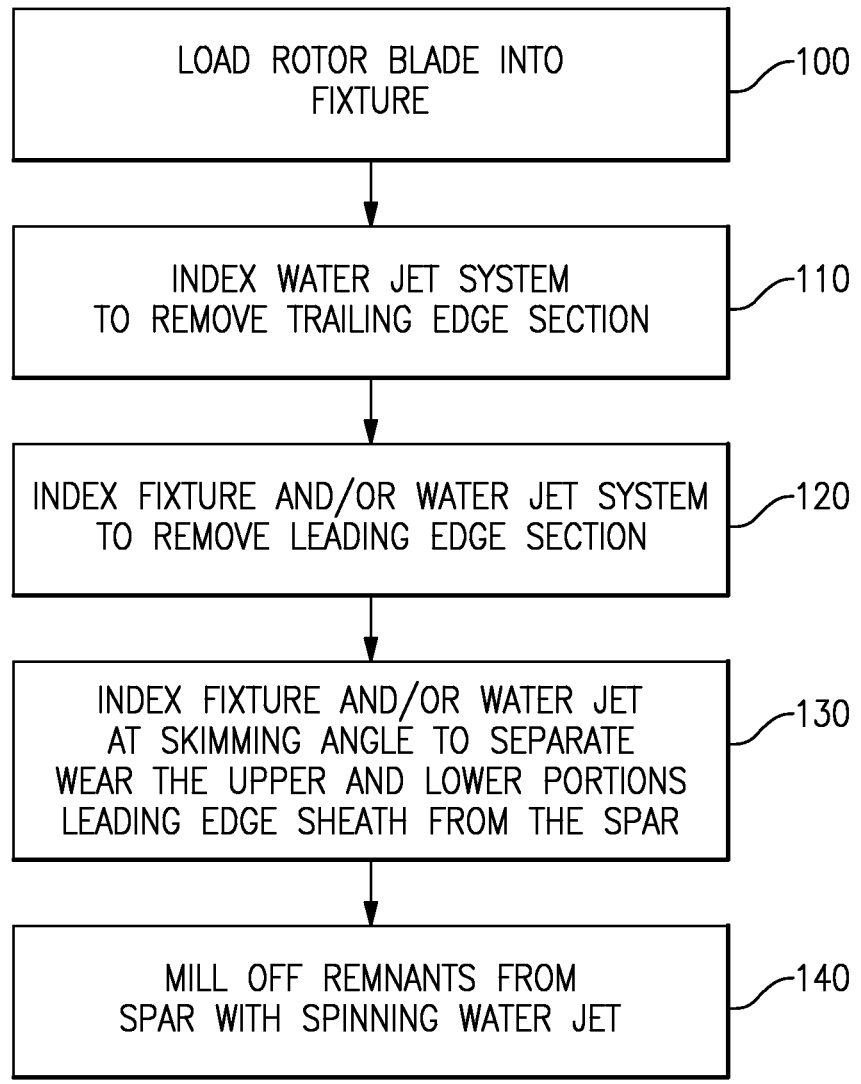
FIG. 3 is a method of refurbishing a rotor blade according to one non-limiting aspect of the present application.

Refurbishing of the main rotor blade spar 48 may generally follow the manufacturing plan as schematically illustrated in FIG. 3.

Figure 4A:
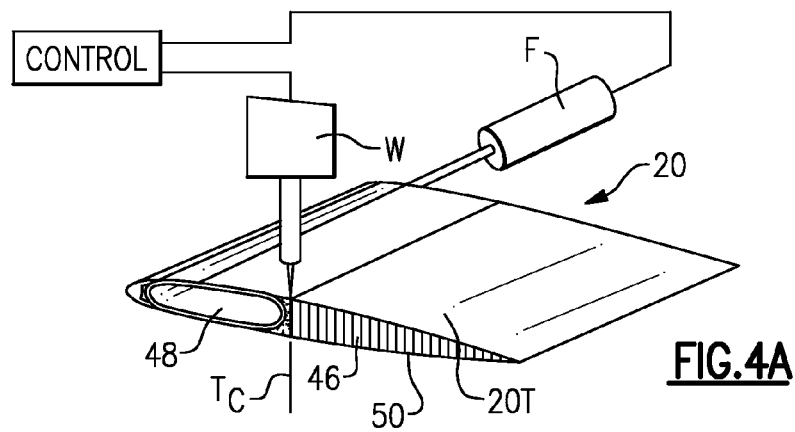
FIGS. 4A-4D are schematic perspective views illustrating steps of FIG. 3.
Figure 5:
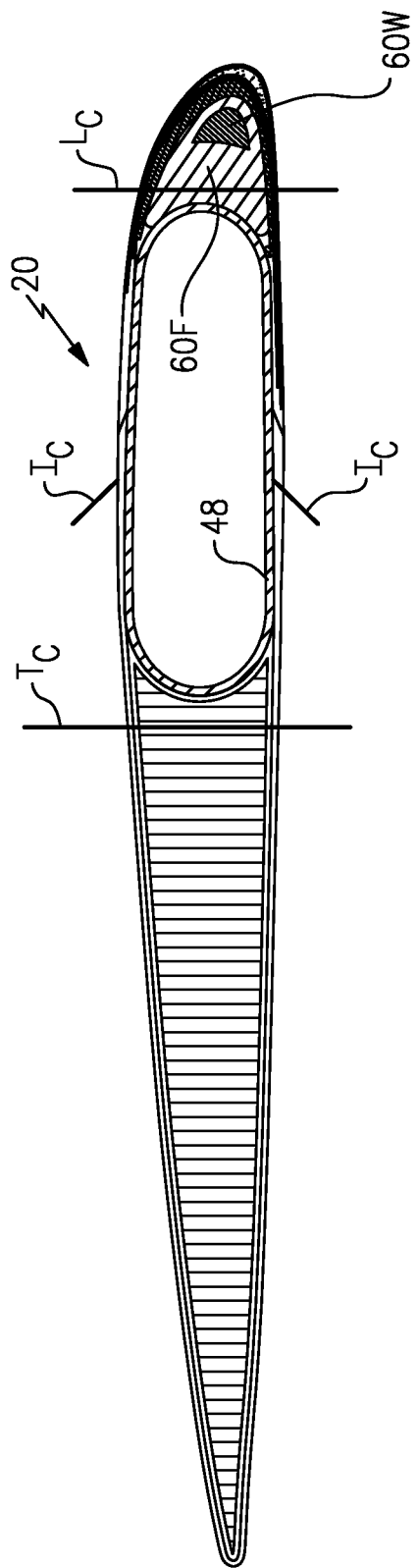
FIG. 5 is an expanded sectional view of a rotor blade illustrating cut line locations to remove a spar of the rotor blade.

In step 100, the rotor blade assembly 20 is loaded into a fixture F (FIG. 4A). The fixture F operates to at least rotate the main rotor blade assembly 20, for example, about the rotor blade longitudinal axis P to facilitate a multiple of cuts (FIG. 5).

Figure 6A:
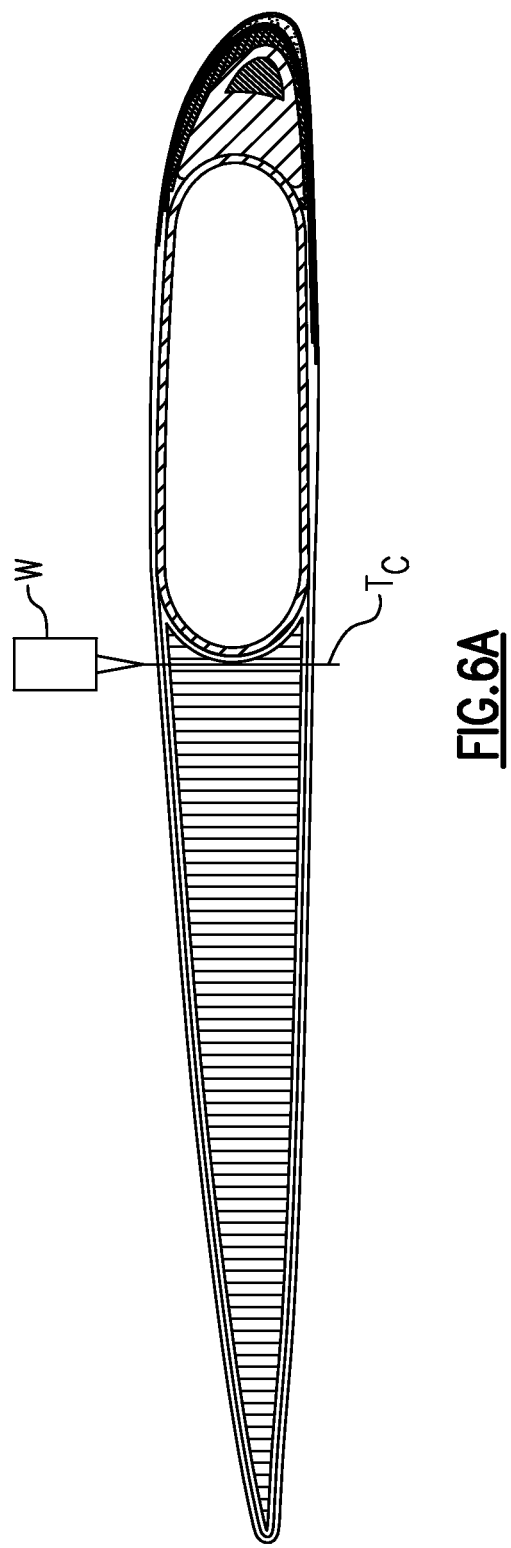
FIG. 6A is an expanded sectional view of a rotor blade illustrating a trailing edge section removed along a trailing edge cut line.

In step 110, a high-velocity waterjet system W (FIG. 4A) such as that manufactured by Ormond, LLC of Auburn, Wash. USA, indexes on the rotor blade assembly 20 relative the spar 48 to remove a trailing edge section 20T through the upper skin 44, the lower skin 50, and the core 46 (FIGS. 4A, 6A). Since the upper skin 44, the lower skin 50, and the core 46 are relatively low-density materials, a pure water jet without abrasives may be utilized to cut along a trailing edge cut line $T_C$. The water jet pressure and travel speed along the trailing edge cut line $T_C$ may be adjusted so as to achieve a desired production rate yet assure an effective cut. It should be understood that the pressures and travel speeds may be dependant at least in part on the materials which are cut, e.g, the trailing edge cut line $T_C$ is through relatively soft materials such as the upper skin 44, the core 46 and the lower skin 50 which may provide for a relatively lower pressure and/or faster travel to achieve the desired production rate. In one non-limiting embodiment, a pressure of 30 KSI (each KSI is 1000 pound-force per square inch) and a travel speed from approximately 1-15 ft/minute with a 5 ft/minute average speed have proved effective.

Figure 4B:
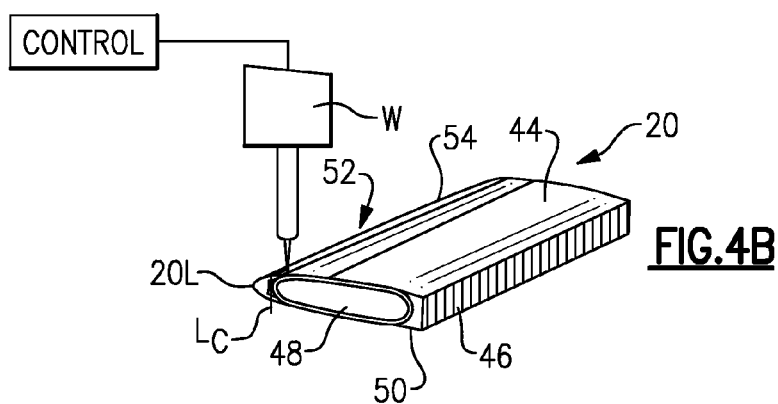
Figure 6B:
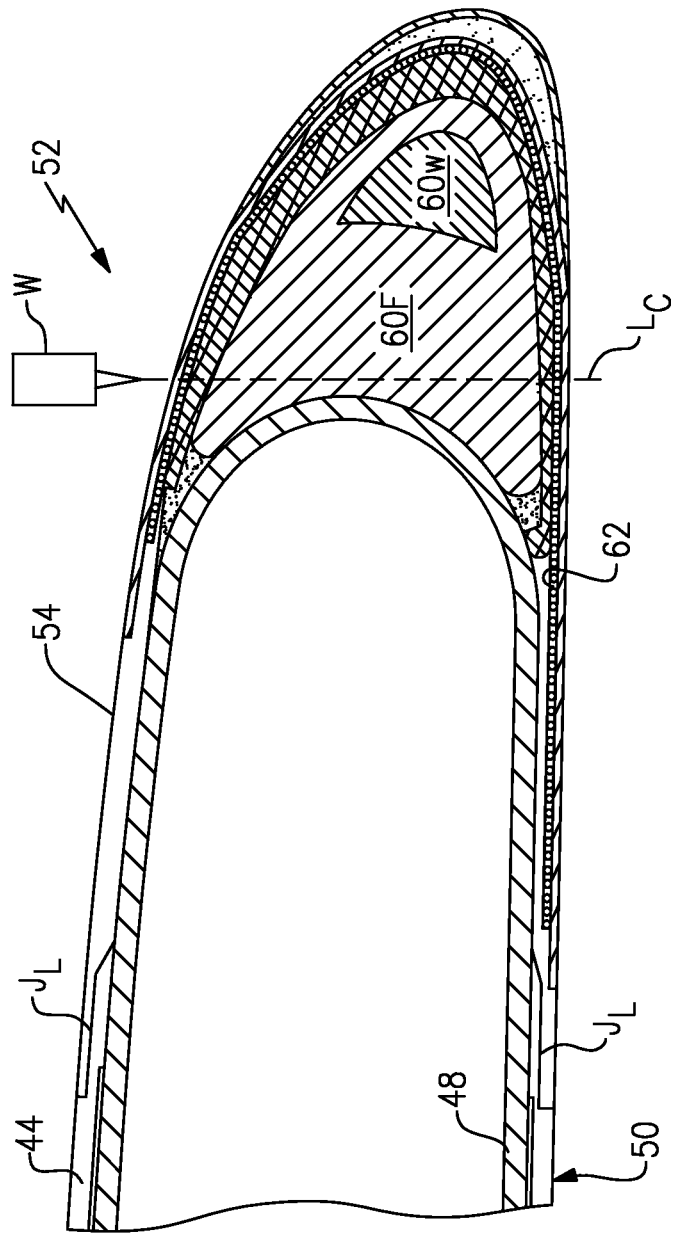
FIG. 6B is an expanded sectional view of a rotor blade illustrating a leading edge section removed along a leading edge cut line.

In step 120, the high-velocity waterjet system W with an abrasive will cut along a length of the leading edge sheath assembly 52 along a leading edge cut line $L_C$ (FIG. 4B) to remove a leading edge section 20L. Whereas only the spar 48 is to be scavenged, the leading edge cut line $L_C$ may be located relatively close to the spar 48 (FIG. 6B). The leading edge cut line $L_C$ may thereby need only cut through first wear-resistant material strip 56 and counterweight assembly 60. It should be understood that the leading edge cut line $L_C$ may alternatively be located in other positions and that the pressures and travel speeds may be dependant at least in part on the materials which are cut, e.g., the leading edge cut line $L_C$ is through relatively hard materials such as the upper skin 44, the lower skin 50, first wear-resistant material strip 56 and the counterweight assembly 60 which may provide for a relatively higher pressure and/or slower travel to achieve the desired production rate. A pressure of 20-50 KSI and a 3 ft/minute average travel speed have proved effective.

Figure 4C:
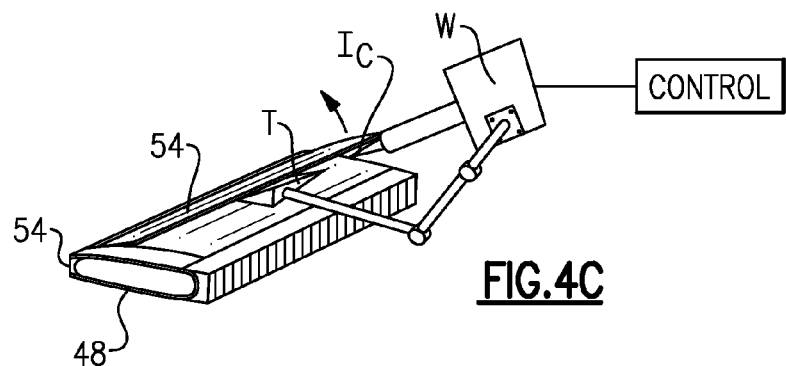
Figure 6C:
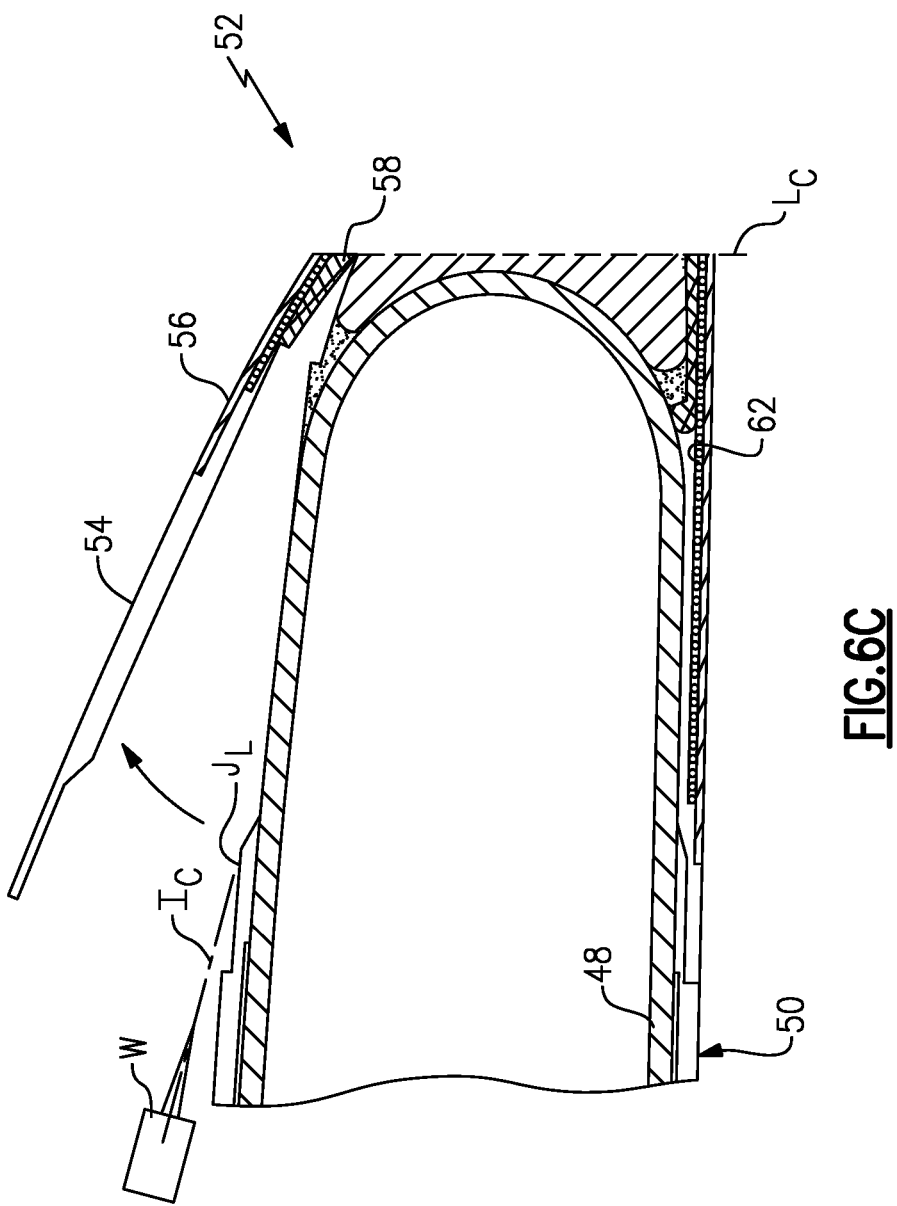
FIG. 6C is an expanded sectional view of a rotor blade illustrating an upper blade sheath section being removed from the rotor blade.
Figure 6D:
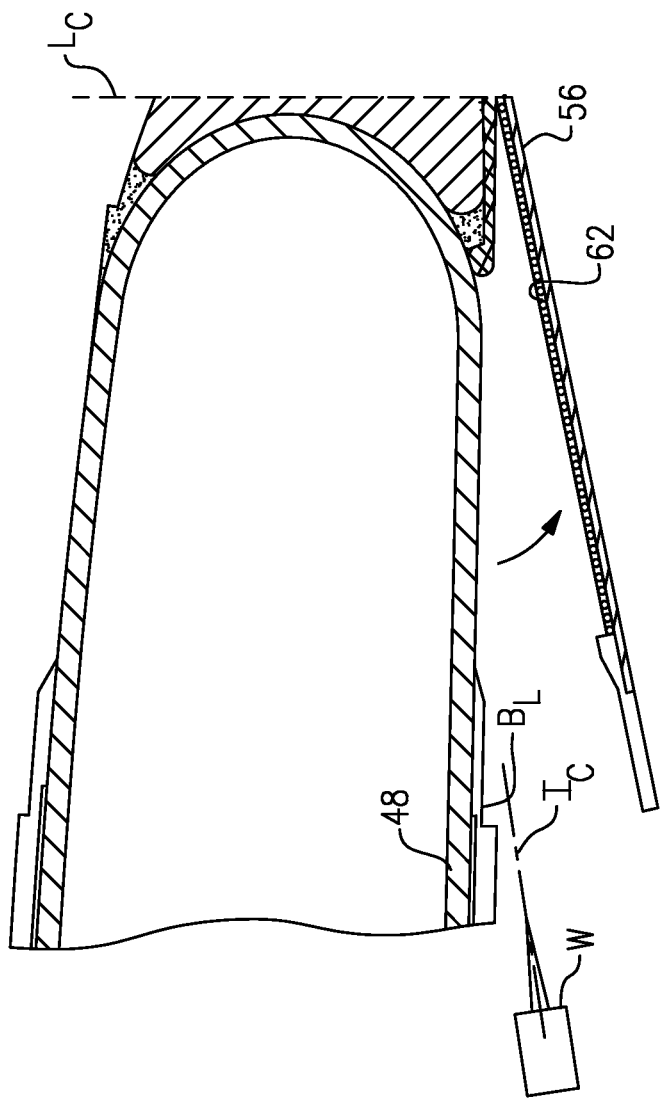
FIG. 6D is an expanded sectional view of a rotor blade illustrating a lower blade sheath section being removed from the rotor blade.

In step 130, having removed the leading edge section 20L and the trailing edge section 20T of the rotor blade assembly 20, the spar 48 will still have remnants of the leading-edge sheath 54 and the skins 44, 50. The upper portion (FIG. 6C) and the lower portion (FIG. 6D) of the leading-edge sheath 54 are removed by a pure water jet directed at a skimming angle $I_C$. The skimming angle $I_C$ is defined herein as an angle which is generally along the rotor blade contour defined by the leading-edge sheath 54 so that the water jet does not impact directly perpendicular to the surface of the spar 48 (FIGS. 4C, 6C, 6D). In one non-limiting embodiment, the water jet initially impacts along a joint line $J_L$ (FIG. 6B) between the upper skin 44 and the lower skin 50 and the leading-edge sheath 54 (FIGS. 6C and 6D) to facilitate removal of the leading-edge sheath 54. This water jet location facilitates entry into an adhesive layer $B_L$ which bonds the upper skin 44 and the leading-edge sheath 54 (FIG. 6C) and the lower skin 50 and the leading edge sheath 54 (FIG. 6D) such that the residual portions of the leading-edge sheath 54 may be essentially peeled off the spar 48. The water jet may be directed from the trailing edge 34 toward the leading edge 32. Alternatively, the water jet may be directed from the leading edge 32 toward the trailing edge 34.

The fixture F operates to position the rotor blade assembly 20, for example, about the rotor blade longitudinal axis P such that the water jet is directed at the desired skimming angle. A hardened tip tool T (illustrated schematically; FIG. 4C), which extends from the water jet head W, operates to further pry open the joint between the portions of the leading-edge sheath 54 which remain and the spar 48. The hardened tip tool T, in one non limiting embodiment, may be of a wedge shape mounted to the water jet head W to follow behind the water jet head W path. The hardened tip tool T may be placed a sufficient distance from the water jet head W to avoid erosion from the water jet backsplash which may contain debris from that which is removed. A pressure of 20-30 KSI and a travel speed of 2-6 ft/minute average have proved effective to peel the upper portions (FIG. 6C) and the lower portion (FIG. 6D) of the leading-edge sheath 54 from the rotor blade assembly 20.

Figure 4D:
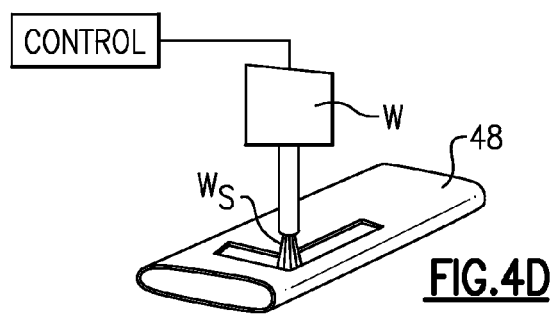

In step 140, the reminder of the core 46, skins 44, 50, primer materials, adhesives and other remnants are milled off the spar 48 by a pure water jets with a spinning waterjet head $W_S$ (FIG. 4D). The spinning waterjet head may be of approximately one inch in diameter. Multiple (4-6) orifice, spinning (400-800 rpm, rotations per minute) water jet heads $W_S$ may be utilized in one non-limiting embodiment to achieve a desired production rate. A pressure below approximately 30 KSI is desired as pressures above approximately 30 KSI may mar the surface of the spar 48 which is manufactured of titanium alloy. A pressure of 20-25 KSI and a 1-2 ft/minute travel speed has proved effective to completely clean the spar 48 yet avoid damage thereto. It should be understood that other pressures and travel speeds may be utilized dependant at least in part on the spar materials in that spars manufactured of aluminum may utilize one travel speed while a spar manufactured of composite materials may utilize another travel speed Once stripped of all remnants, the spar 48 is ready for reuse within a new rotor blade assembly.

Heater Mat Replacement

Figure 7:
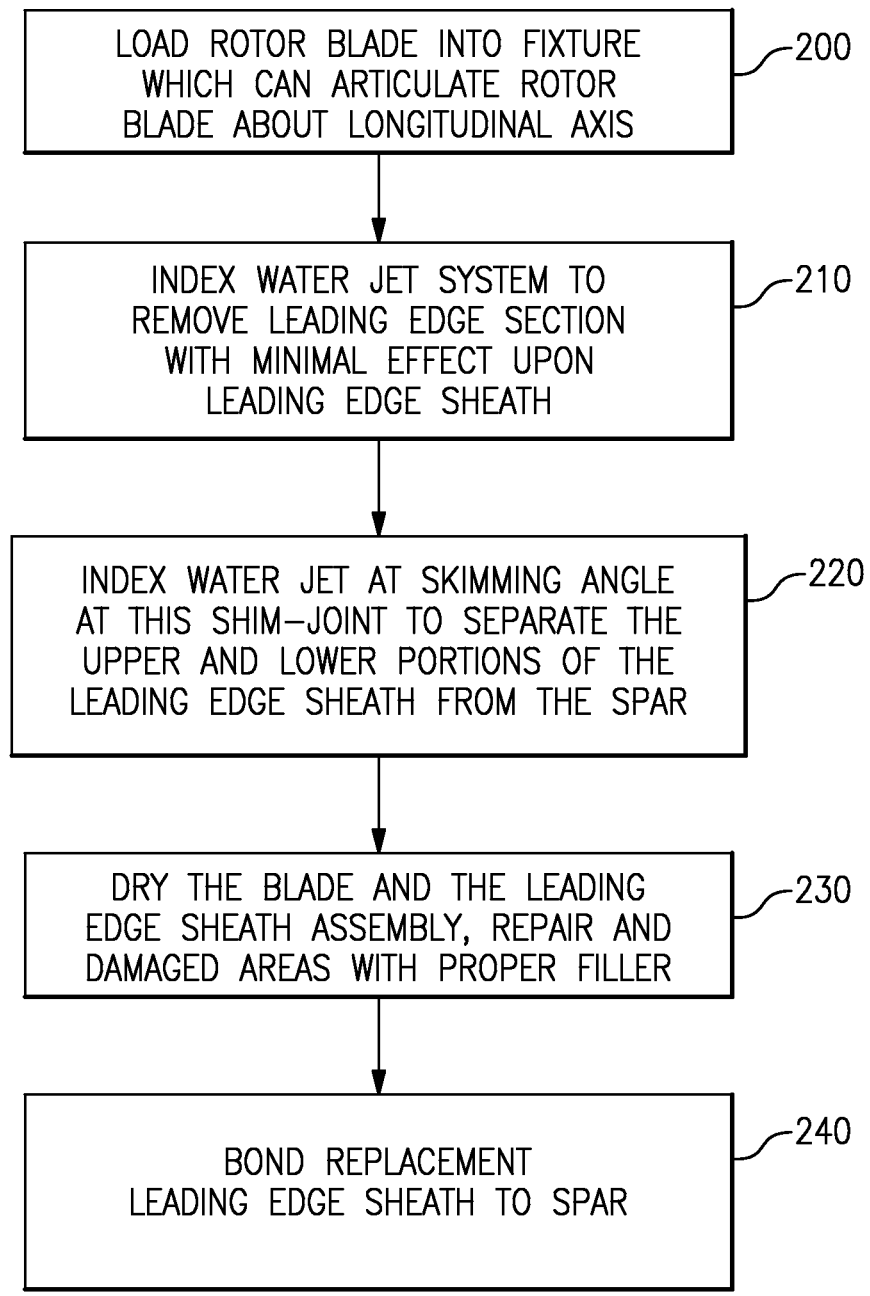
FIG. 7 is a method of refurbishing a rotor blade according to one non-limiting aspect of the present application.

Replacing the de-ice heater mat assembly 62 of the main rotor blade assembly 20 may generally follow the manufacturing plan as schematically illustrated in FIG. 7.

Figure 8A:
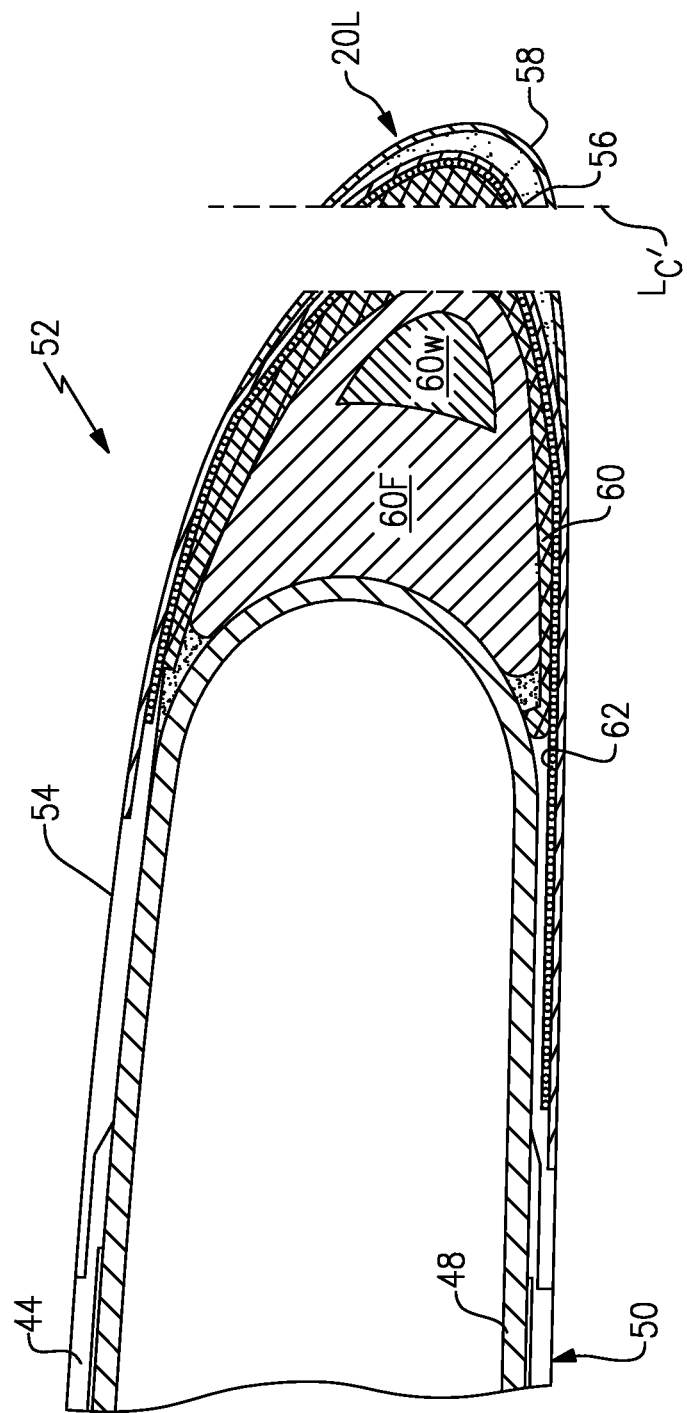
FIG. 8A is an expanded sectional view of a rotor blade illustrating a leading edge section removed along a leading edge cut line to separate the wear-resistant material strip into upper and lower portions.

The rotor blade assembly 20 is initially loaded into the fixture F as described above (step 200). The high-velocity waterjet head system W with an abrasive cuts along a length of the leading edge assembly 52 along a leading edge cut line $L_C'$ to thereby remove a leading edge section 20L as generally described above (step 210). The leading edge cut line $L_C'$ may be located through both the first wear-resistant material strip 56 and the second wear-resistant material strip 58 such that the leading edge section 20L contains at least a portion of the de-ice heater mat assembly 62 yet has minimal or no impact upon the counterweight assembly 60 (FIG. 8A). That is, the leading edge cut line $L_C'$ is located to have minimal effect upon the counterweight assembly 60, but may cut through a ply of the filler 60F. A pressure of 20-50 KSI and a 3 ft/minute average travel speed have proved effective.

Figure 8B:
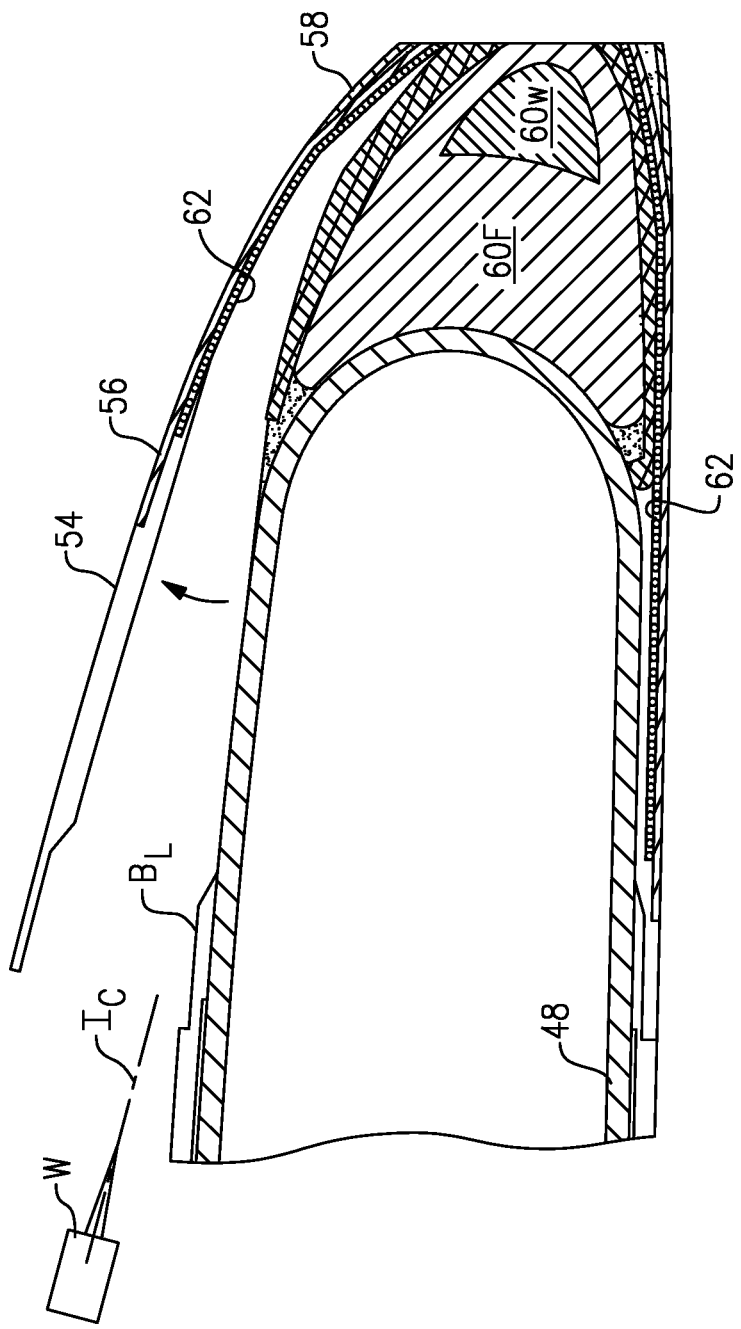
FIG. 8B is an expanded sectional view of a rotor blade illustrating a upper blade sheath section and de-ice heater mat being removed from the leading edge section of the rotor blade.

Referring to FIG. 8B (step 210), the upper section of the leading-edge sheath 54 and the de-ice heater mat assembly 62 is removed by a pure water jet directed at a skimming angle $I_C$ generally parallel to the blade contour so that the water jet does not impact directly on the surface of the spar 48. In one non-limiting embodiment, the water jet follows the joint line between the upper skin 44 and the leading-edge sheath 54 along the length of the blade to facilitate removal of the failed de-ice heater mat assembly 62 within the upper portion of the leading-edge sheath 54. This water jet location facilitates entry into an adhesive layer $B_L$ which bonds the upper skin 44 and the leading-edge sheath 54.

Figure 8C:
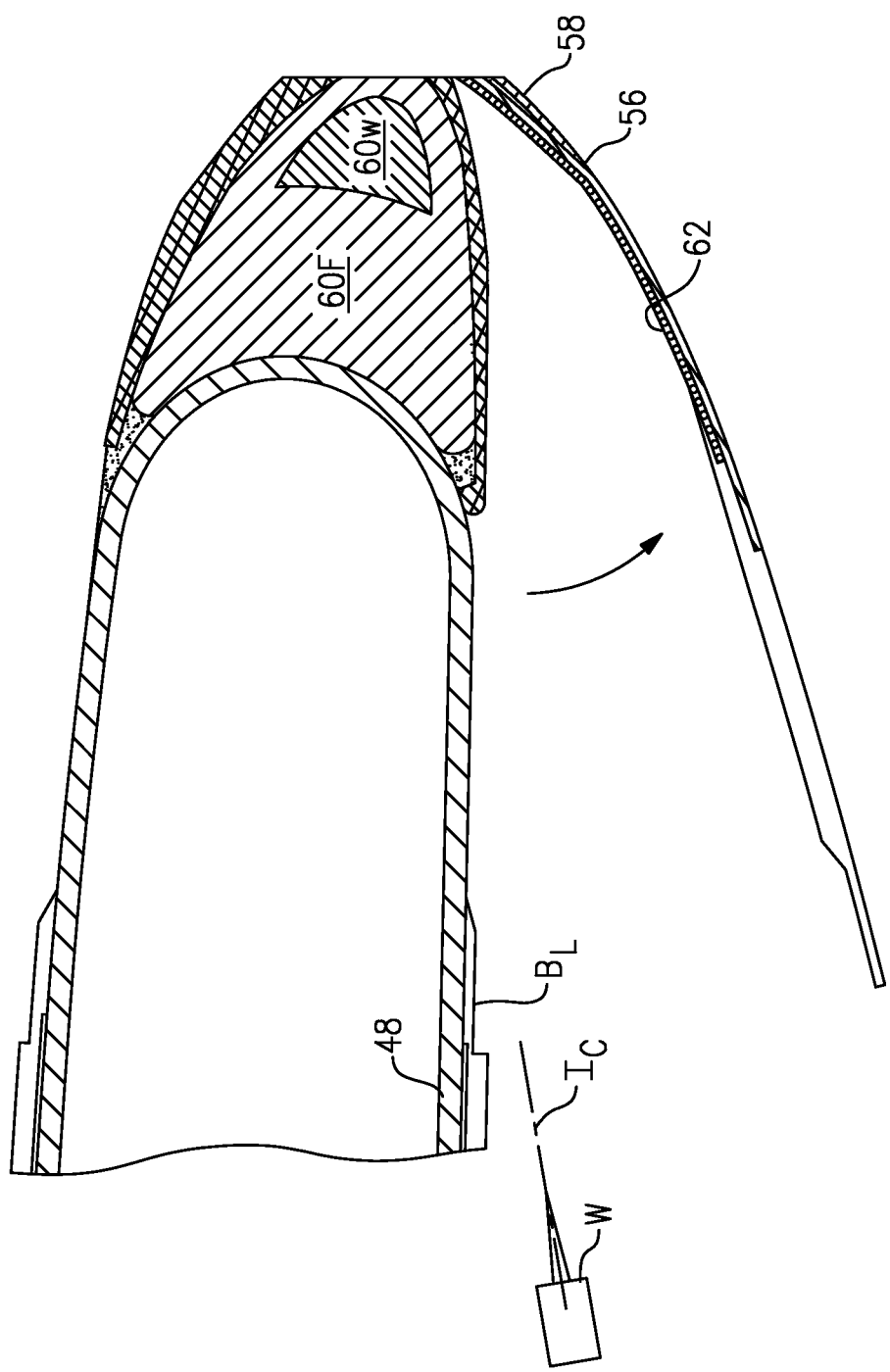
FIG. 8D is an expanded sectional view of a rotor blade illustrating a cleaned leading-edge of the rotor blade to receive a new leading-edge sheath with de-ice heater mat assembly.
FIG. 8E is an expanded sectional view of a rotor blade illustrating a repaired rotor blade assembly.

A tool arrangement such as that illustrated in FIG. 4C facilitates the separation of the section of the leading-edge sheath 54 from the spar 48. A pressure of 20-35 KSI and a travel speed of 2-6 ft/minute average have proved effective. The process is repeated on the lower surface of the main rotor blade assembly 20 (FIG. 8C) to remove the lower portion of the leading edge sheath 54. The entire de-ice heater mat assembly 62 is thereby removed with the leading-edge sheath 54.

Figure 8D:
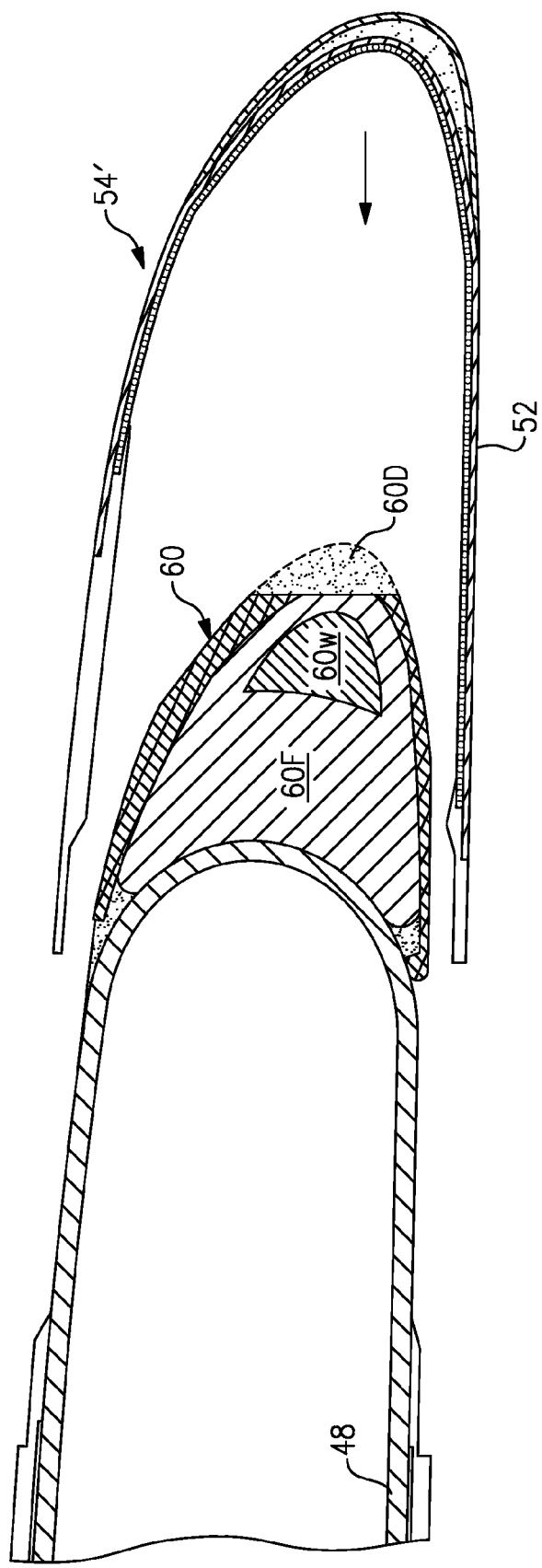

Pieces of the de-ice heater mat assembly 62 primer materials, adhesives, and other remnants are milled off the spar 48 and counterweight assembly 60 with a spinning waterjet head such as schematically illustrated in FIG. 4D. Once the remnants have been removed, the counterweight assembly 60 is allowed to dry and any filler 60F that may have been damaged at the tip 60D is repaired (FIG. 8D; Step 230).

Figure 8E:
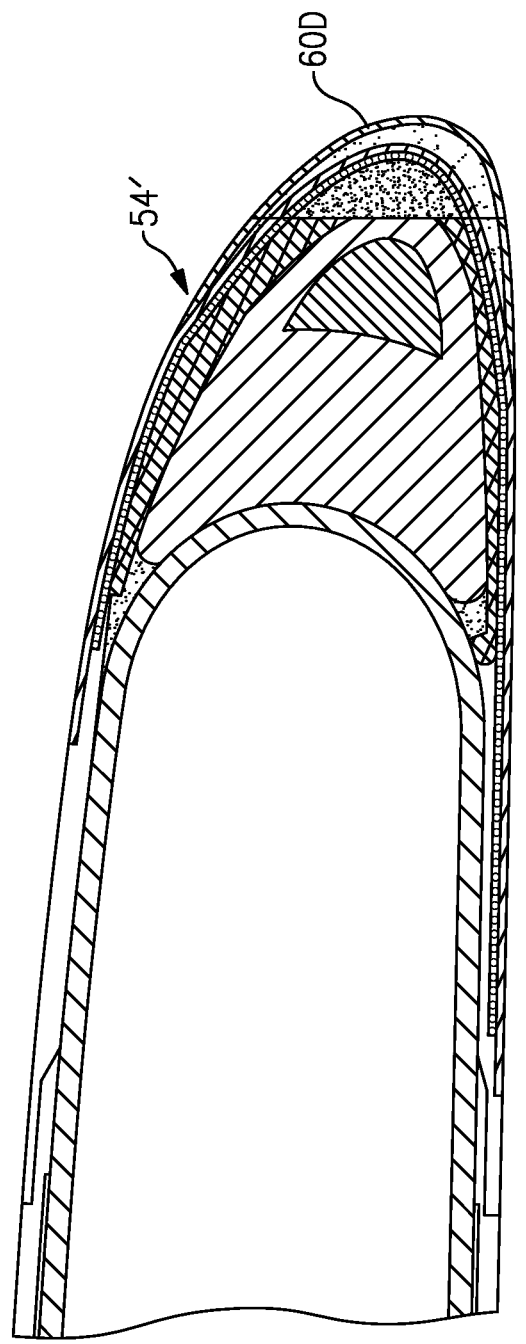

Subsequently, a replacement leading-edge sheath 54 with de-ice heater mat assembly 62 is bonded to the spar 48 and counterweight assembly 60 to interface with the upper skin 48 and the lower skin 50 so as to provide a refurbished rotor blade assembly 20 (FIG. 8E; step 240).

The water jet milling process does not generate toxic fumes and avoids hazardous waste. No waste disposal cost is involved as the process is essentially completely green. Economic evaluation of the process demonstrated that once implemented, this process will provide significant monetary savings through energy costs alone. Furthermore, the process is readily automatized to eliminate repeated manual labor.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of refurbishing a rotor blade comprising:
   directing a waterjet to cut a leading edge section from a rotor blade along a leading edge cut line generally parallel to a longitudinal feathering axis; and
   directing the waterjet at an angle relative to a rotor blade contour to separate a leading edge sheath portion from the rotor blade, wherein the rotor blade includes a spar separate from the leading edge and the leading edge sheath portion.

2. The method as recited in claim 1, wherein directing the waterjet to cut the leading edge section includes cutting a leading edge strip off of the rotor blade.

3. The method as recited in claim 2, further comprising mixing an abrasive with the waterjet.

4. The method as recited in claim 2, further comprising directing the waterjet at a pressure of 30 KSI and a travel speed from 1-15 ft/minute along the leading edge cut line.

5. The method as recited in claim 4, further comprising directing the waterjet at a 5 ft/minute average travel speed.

6. A method of refurbishing a rotor blade comprising:
  directing a waterjet to cut a leading edge section from a rotor blade along a leading edge cut line generally parallel to a longitudinal feathering axis;
  directing the waterjet at an angle relative to a rotor blade contour to separate a leading edge sheath portion from the rotor blade, wherein the rotor blade includes a spar separate from the leading edge and the leading edge sheath portion; and
  directing the waterjet to cut a trailing edge section off of the rotor blade along a trailing edge cut line generally parallel to the longitudinal feathering axis.

7. The method as recited in claim 6, further comprising directing the waterjet at a pressure of 20-50 KSI and a 3 ft/minute average travel speed.

8. The method as recited in claim 1, further comprising directing the waterjet at a skimming angle relative to a rotor blade contour.

9. The method as recited in claim 8, further comprising separating the leading edge sheath portion from an upper surface of the rotor blade.

10. The method as recited in claim 8, further comprising separating the leading edge sheath portion from a lower surface of the rotor blade.

11. The method as recited in claim 8, further comprising directing the water jet at a pressure of 20-35 KSI and a 2-6 ft/minute average travel speed.

12. The method as recited in claim 1, further comprising directing a spinning waterjet at a pressure of 20-30 KSI and a 1-2 ft/minute travel speed to mill a remnant from the spar of the rotor blade.

13. The method as recited in claim 12, further comprising directing the spinning waterjet at a pressure below approximately 30 KSI to clean the spar.

14. The method as recited in claim 1, further comprising:
  directing the waterjet along a trailing edge cut line generally parallel to the longitudinal feathering axis to cut off a trailing edge section of the rotor blade; and
  directing a spinning waterjet to mill a remnant from the spar of the rotor blade.

15. The method as recited in claim 1, wherein the rotor blade is a rotary wing aircraft main rotor blade.

16. The method as recited in claim 1, wherein the rotor blade includes an upper skin, a lower skin, and a core.

17. The method as recited in claim 16, wherein the core includes a honeycomb material.

18. The method as recited in claim 1, wherein the leading edge sheath portion includes at least one wear resistant material strip.

19. The method as recited in claim 1, wherein the rotor blade rotates about a substantially vertical axis during normal operation.

* * * * *